July 14, 1925.

J. W. DIRKSON ET AL 1,545,815

BEAD SETTING MECHANISM

Filed Nov. 16, 1920

John W Dirkson, Lee E Clough, Inventors:

Attorney.

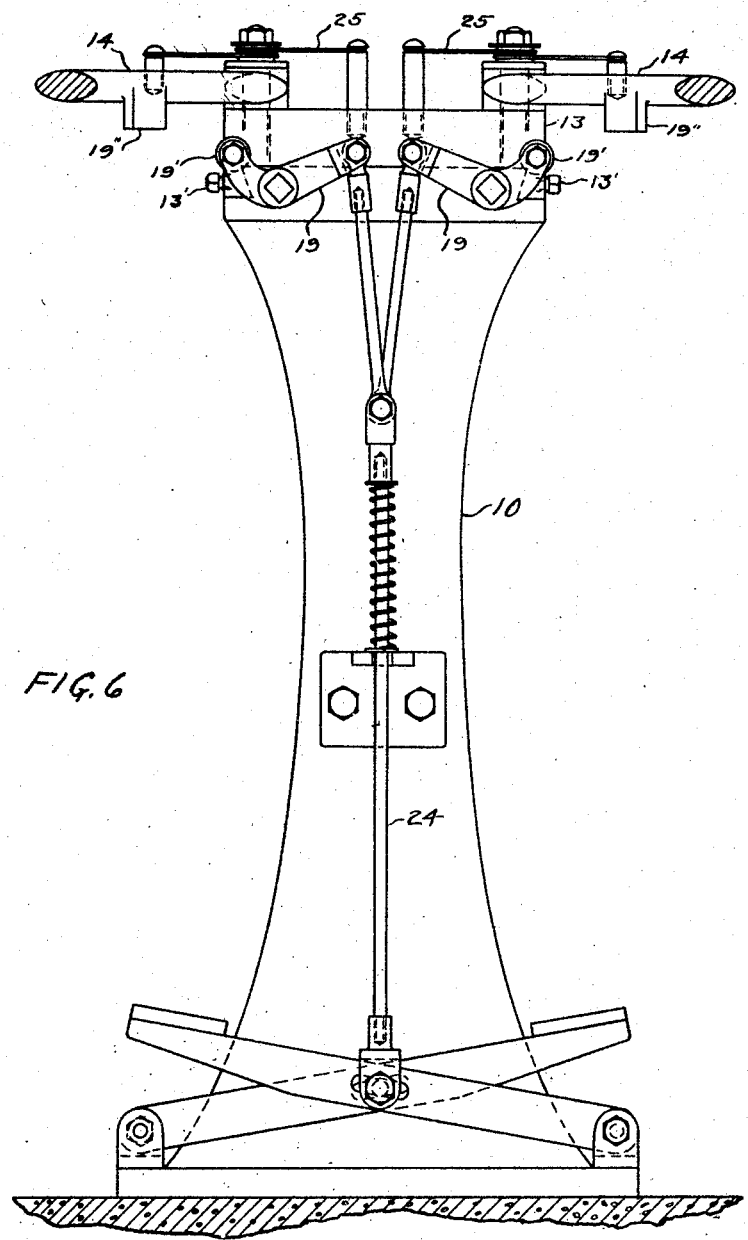

Patented July 14, 1925.

1,545,815

UNITED STATES PATENT OFFICE.

JOHN W. DIRKSON, OF KENT, AND LEE E. CLOUGH, OF AKRON, OHIO, ASSIGNORS TO THE MASON TIRE AND RUBBER COMPANY, OF KENT, OHIO, A CORPORATION OF OHIO.

BEAD-SETTING MECHANISM.

Application filed November 16, 1920. Serial No. 424,445.

*To all whom it may concern:*

Be it known that we, JOHN W. DIRKSON, a citizen of the United States, residing at Kent, in the county of Portage and State of Ohio, and LEE E. CLOUGH, a citizen of the United States, residing at Akron, in the county of Summit and State of Ohio, have invented certain new and useful Improvements in Bead-Setting Mechanism, of which the following is a specification.

Our invention relates to improvements in bead-setting mechanism, and has for its object the provision of means for expeditiously applying the beads to the carcass or casing of a pneumatic tire.

The most expeditious method for building the carcasses of tires involves the successive advance of the core whereon the casing is built to different appliances for performing corresponding constructive operations thereon. One of the most important of these appliances is the bead-setting mechanism, since the value of the completed casing depends largely upon the accuracy and strength with which the beads are applied to its inner peripheral edges. In order to apply these beads expeditiously we have found it necessary to construct a novel mechanism comprising essentially one or more arms individually equipped with a contoured bead-setting roll adapted to apply pressure essentially at right angles to the inner peripheral wall or walls of the tire casing. Sufficient pressure to make the bead strongly adhere to the casing and force out all of the air may not be expeditiously applied manually, and by preference, we have equipped our improved mechanism with power applying means for exerting considerable pressure momentarily while the bead is being rolled into position.

Moreover it is vitally essential that the beads shall be accurately set upon the tire casing. In order to accomplish this we preferably provide an interchangeable or adjustable head, mounting the pivoted bead-setting rolls, which head in turn is temporarily set in proper position by means of an adjustment gauge corresponding to the size of casing intended to be operated upon.

Further details of our improvements may be better explained by making reference to the accompanying drawings wherein:

Fig. 5 is a fragmentary front elevation showing one of the operating cams in its fully retracted position and the arm partially swung back, and Fig. 6 illustrates a modification whereby both cams may be concurrently actuated to set the right and left hand beads simultaneously.

Throughout the several figures of the drawings we have employed the same character of reference to indicate similar parts.

The standard 10 is assumed to be bolted securely in position upon the floor, past which the cores 11 with their carcasses 12 are successively advanced for the operation of setting one or both of the beads thereon. At the top of the standard an adjustable head 13 is fixedly mounted by bolts 13′, and a gauge 13″ accurately indicates the correct position for setting the beads of the different sizes of casings. As will be further explained, these heads may be made interchangeable for the purpose of setting beads of different contour or upon casings of materially different shape or size. However, as it is essential that the beads shall be affixed to the casings with extreme exactness, we have provided a head capable of being accurately gauged in position and fixedly set for the particular size of casing to be operated upon.

Figure 3:
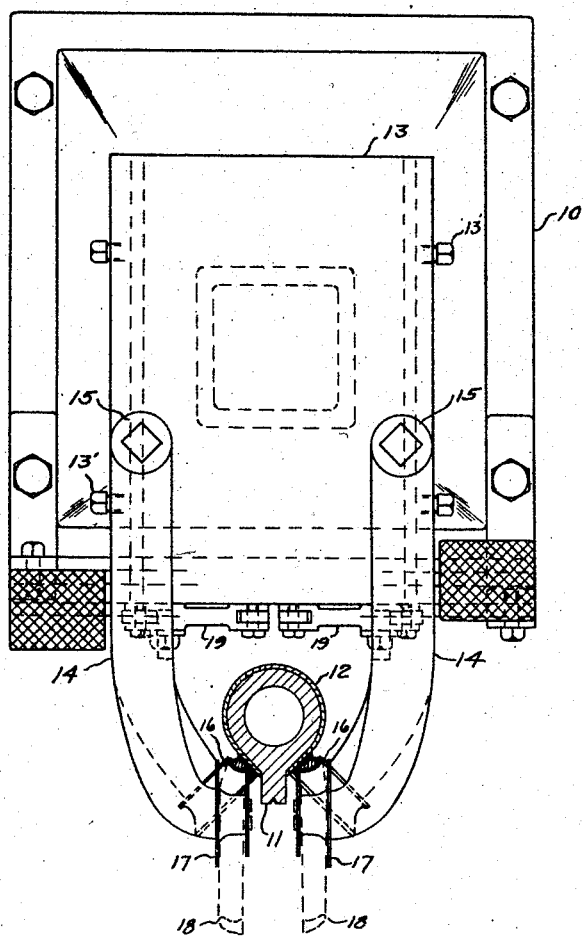
Fig. 3 is a plan view of said mechanism illustrating the tire casing, the beads and core in transverse section, as well.

At each side of the head there is provided a pivoted lever arm 14, which may be freely swung upon its pivotal bolt 15 so that its terminal bead-setting roll 16 may be readily engaged with or disengaged from the inner edge of the tire casing, as best indicated respectively in Figs. 3 and 5. It will be observed that the particular form of lever arm shown in the drawings is bifurcated with upper and lower branches 14′, 14″ respectively extending inwardly from the body of the arm at different angles. The upper arm 14′ is provided with a guiding roll 17 with its axis set approximately at an angle of 45° with that of the bead-setting roll 16.

Speaking a little more in detail as to these two rolls which may be symmetrically duplicated upon both sides of the supporting head, it will be seen upon referring to Fig. 3 that the bead-setting rolls 16 are contoured accurately to fit the lower faces of the beads 18. This contour is substantially reversed in position with respect to the guiding rolls 17, which are superposed so that the bead will be directed accurately into position within the contoured groove of the associated bead-setting roll as best shown in Fig. 2.

Figure 1:
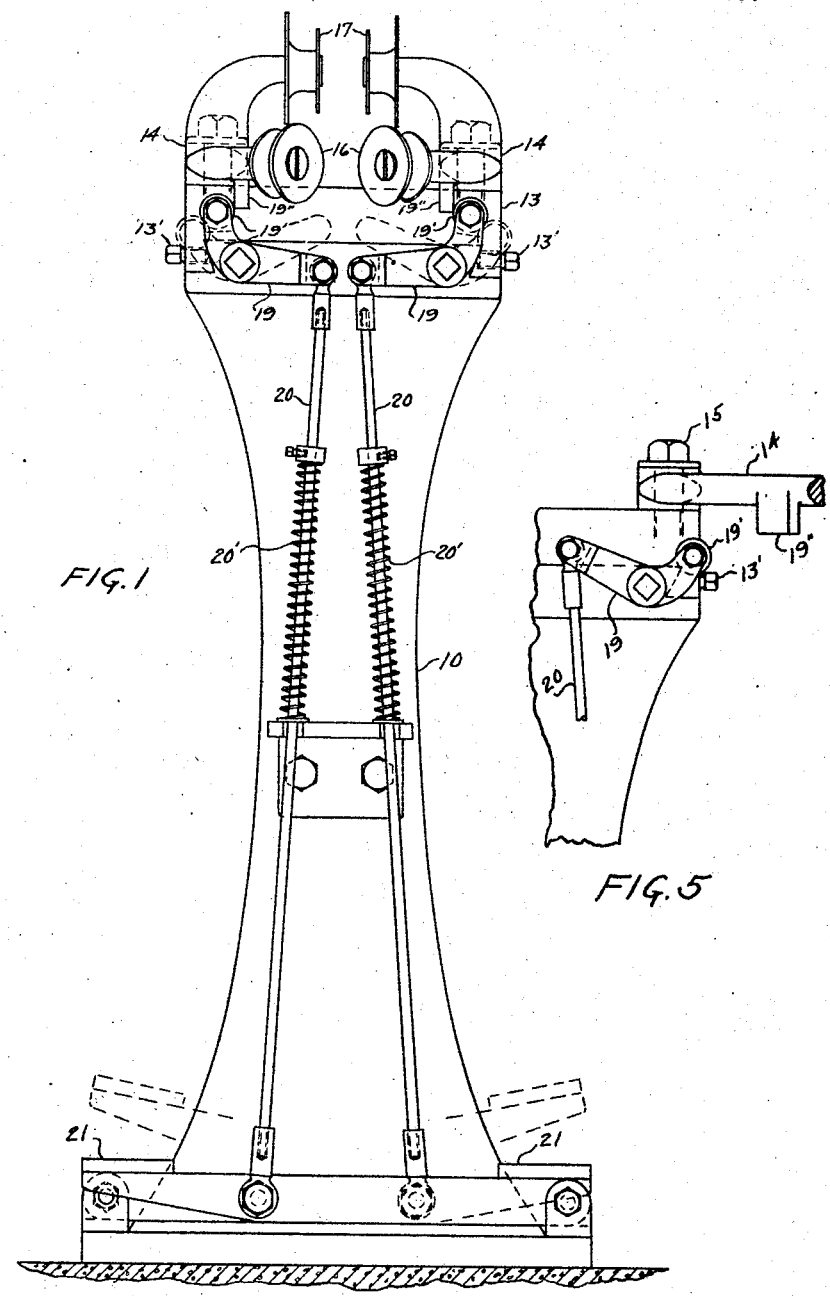
Figure 1 is a front view of a bead-setting mechanism embodying our invention.

Pivoted at the front of the standard are two cam levers 19 respectively equipped with rollers 19′. The longer ends of these levers are connected by rods 20 with the respective foot levers 21 while coiled springs 20′ are tensioned to retract the cam levers to their dotted line positions of Fig. 1 or the full line position shown in Fig. 5. In this latter position it is quite obvious that the pivoted levers may be freely swung past their respective cam levers so that first one and then the other may be engaged and disengaged with the inner periphery of the tire casing accordingly. It will be noted that merely for purposes of illustration the cam levers are shown in Figs. 1 and 2 in their positions for applying pressure to the bead-setting rolls thru the engagement of the rollers 19′ with the depending lugs 19″ provided upon the lever arms 14.

Figure 2:
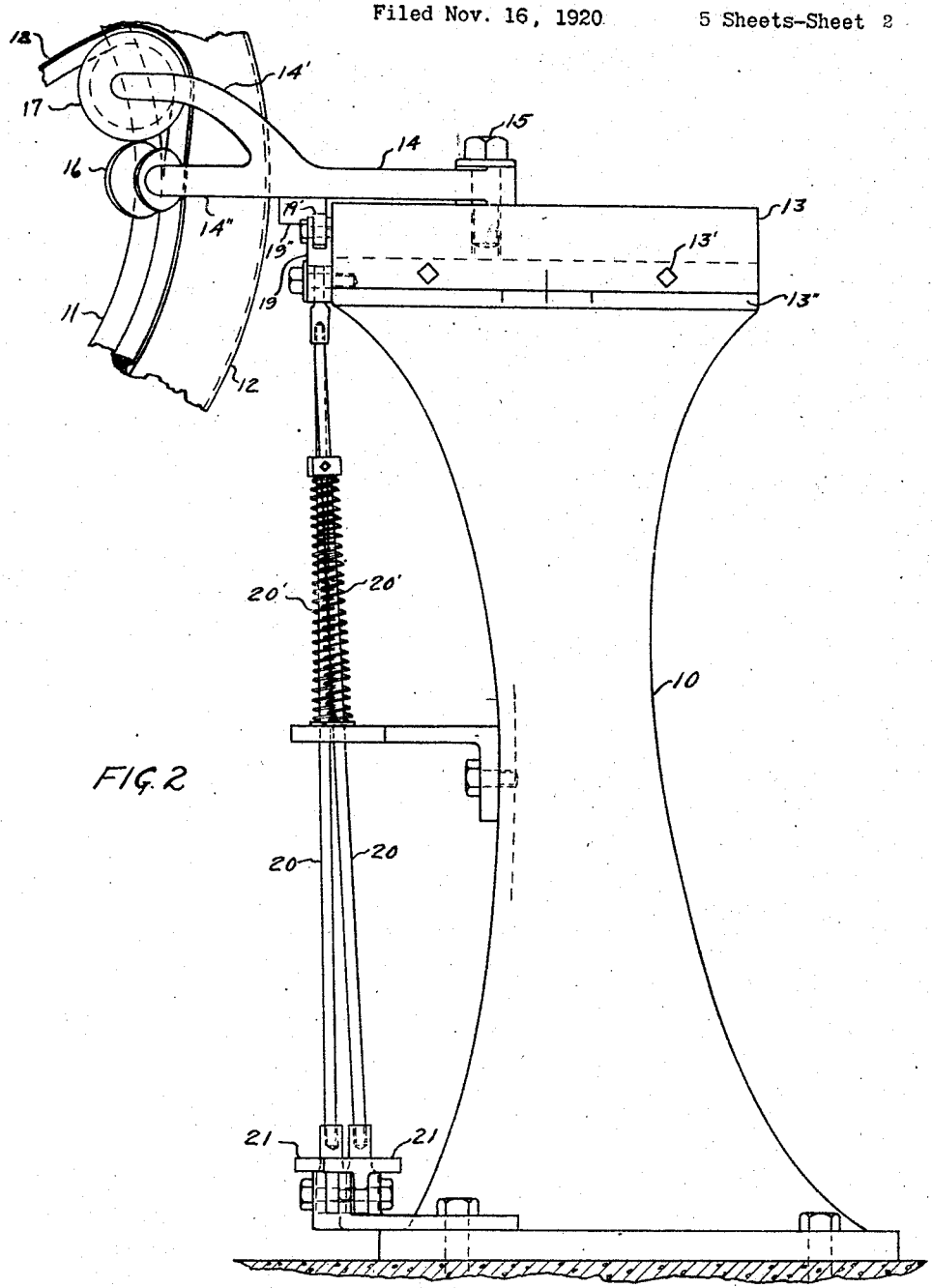
Fig. 2 is a view in side elevation of said mechanism, also showing the tire casing and the bead in process of application, both in fragmentary form.

Normally the lever arms will be swung back approximately at right angles with their operative positions so that the core and casing may be advanced to the position best shown in Fig. 3, whereupon the workman will place the flexible endless bead 18 with its bottom or lower face accurately embraced within the groove of the right hand bead-setting roll 16, while said bead is supported in the guiding roll 17, as best shown in Fig. 2. Preferably the disengaged portion of the bead is manually held away from the casing as the workman swings the lever arm into its operative position and applies pressure thereto by means of the foot lever and its connected cam. The core being slowly rotated will permit the bead to be accurately affixed to the right hand inner edge of the carcass, and with a few rotations of said core the powerfully deflected lever arm and bead-setting roll will serve firmly to set the bead in its proper position. This powerful action also forces any air bubbles from between the cemented surfaces of the bead and carcass. Moreover it will be observed that the lever arm and bead-setting roll are so positioned that power is applied at right angles to the engaged surface of the carcass and core so that there is no possibility of displacing the bead in the quickly accomplished procedure just above indicated. The left hand bead may be applied in exactly the same way either upon the same mechanism or upon one immediately adjacent thereto, to which the core and casing may be advanced in succession, consequently no description of this step is required.

Figure 4:
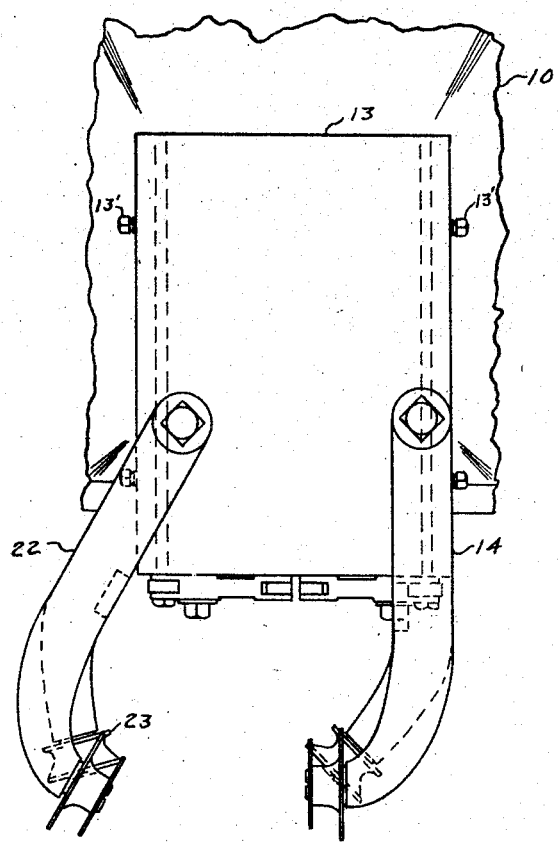
Fig. 4 is a fragmentary plan view of a modified form of interchangeable head.

In order that our improved bead-setting appliance may be equally adapted for applying beads on carcasses of varying size and character, we preferably equip such appliance with interchangeable heads such as shown in Fig. 4, for example wherein the left hand lever arm 22 is set slightly to the rear of the lever arm 14 upon the right and the contour of its bead-setting roll 23 is adapted for a different shaped bead. Therefore the corresponding bead-setting appliance would be reversely arranged to have the right hand arm and roll like the arm 22 and roll 23, so that each workman would respectively apply the left hand and the right hand beads only.

As the workman becomes skilled in the operation of our bead-setting appliance it is entirely practicable still further to shorten the operation by having both beads set at the same time. This is accomplished as above described, except that the workman will fit the right and left hand beads within their respective symmetrical rolls 16. Upon manually swinging both lever arms 14 into their operative position of Fig. 3, the connected cams 19 are operated by a common actuating rod 24 firmly to press both of the bead-setting rolls with their contained beads simultaneously against the carcass. Supported as they are upon the highly efficient, angularly disposed guiding rolls 17, both beads may thus be applied approximately in the same length of time that either the right or left hand bead may be set, thereby materially speeding up the operation.

With the above described operation and modification, each lever arm 14 preferably is provided with a spring 25 tensioned normally to throw the levers into their retracted positions. Accordingly, upon their release from the actuating cams, the lever arms will be swung free from the casing and core, so that the latter may be immediately advanced for the next step or operation.

Further changes and modifications may readily be made in the construction herein shown and described, and we do not wish to be understood as limiting our invention to the particular details herein set forth by way of example.

Having now described the preferred embodiment of our invention, we claim as new and desire to secure by Letters Patent, the following:

1. In a bead-setting appliance, the combination with a pivoted lever arm, of a guiding roll and an associated bead-setting roll rotatably mounted thereon in position to be swung into engagement with the tire carcass, a cam member associated therewith to apply pressure to the bead, and means for actuating said member, substantially as set forth.

2. In a bead-setting appliance, the combination with a pivoted lever arm adapted to be swung into and out of operative position with respect to a tire carcass, of a contoured bead-setting roll and a superposed guiding roll rotatably mounted at different angles on said arm respectively adapted for applying the bead and for supporting and guiding the bead into the contour of the setting roll, substantially as set forth.

3. In a bead-setting appliance, the combination with a fixed standard, of an adjustable head mounted thereon and equipped with an adjustment gauge and with a long pivoted arm adapted freely to swing out of and into position to engage the tire carcass; said arm terminally mounting a contoured bead-setting roll and an associated guiding roll, substantially as set forth.

4. In a bead-setting appliance, the combination with a fixed standard, of opposing pivoted lever arms mounted thereon in position to be swung into and out of engagement with the inner periphery of a tire carcass, a contoured bead-setting roll and a superposed guiding roll rotatably mounted at different angles on each arm, and means for applying inward pressure to the bead-setting roll, substantially as set forth.

5. A bead-setting mechanism, comprising a fixed standard, an interchangeable head having fixed positions of adjustment thereon, an associated adjustment gauge therefor, an extended lever arm pivoted upon said head, a contoured bead-setting roll and a superposed guiding roll, rotatably mounted at different angles terminally on said arm and actuating means for applying pressure to the bead-setting roll, substantially as set forth.

6. A bead-setting mechanism, comprising a fixed standard and an associated set of interchangeable heads therefor having predetermined positions for operating from the standard, an associated gauge adapted to indicate the position of each head with respect to the standard; said heads each being equipped with a pivoted arm mounting a bead-setting roll, and a guide roll angularly disposed with respect thereto and means for forcibly pressing said roll and its contained bead against the tire carcass, substantially as set forth.

7. A bead-setting mechanism, comprising a bifurcated pivoted lever arm, a guide roll and a bead-setting roll respectively positioned upon said lever arm; the latter in position to be swung into engagement with the tire carcass, and means for applying pressure to the bead-setting roll, substantially as set forth.

8. A bead-setting mechanism, comprising a pivoted lever arm, a bead-setting roll terminally positioned thereon, a guide roll angularly positioned in advance of and associated with said bead-setting roll, whereby the bead is presented to the latter in proper relation for its attachment to the carcass, and means for applying pressure to the bead-setting roll, substantially as set forth.

In testimony whereof we do now affix our signatures.

JOHN W. DIRKSON.
LEE E. CLOUGH.